(12) United States Patent
Roussat et al.

(10) Patent No.: US 10,137,628 B2
(45) Date of Patent: Nov. 27, 2018

(54) DUAL TENTER CLIP AND TABLE ASSEMBLY AND TRANSVERSE SHEET STRETCHING PLANT COMPRISING SAME

(71) Applicant: Andritz AG, Graz (AT)

(72) Inventors: Pierre Roussat, Montmélian (FR); Yannick Bejat, Tresserve (FR)

(73) Assignee: BRUECKNER MASCHINENBAU GMBH & CO. KG, Siegsdorf (DE)

( * ) Notice: Subject to any disclaimer, the term of this patent is extended or adjusted under 35 U.S.C. 154(b) by 499 days.

(21) Appl. No.: 14/277,307

(22) Filed: May 14, 2014

(65) Prior Publication Data

US 2014/0339728 A1   Nov. 20, 2014

(30) Foreign Application Priority Data

May 16, 2013  (EP) ..................................... 13167973

(51) Int. Cl.
| | | |
|---|---|---|
| *B29C 55/08* | (2006.01) | |
| *B29C 55/20* | (2006.01) | |
| *B29K 101/00* | (2006.01) | |
| *B29K 105/00* | (2006.01) | |

(52) U.S. Cl.
CPC .............. *B29C 55/20* (2013.01); *B29C 55/08* (2013.01); *B29K 2101/00* (2013.01); *B29K 2105/256* (2013.01); *B29K 2995/005* (2013.01)

(58) Field of Classification Search
CPC ......... B29C 55/20; B29C 55/02; B29C 55/00; B29C 55/04; B29C 55/045; B29C 55/085; B29C 55/08; B29K 2101/00; B29K 2105/256; B29K 2995/005

USPC ................ 264/164, 288.4, 280, 290.7, 291, 264/DIG. 73; 425/66, DIG. 53; 26/87, 26/88, 89, 90, 91, 94, 95, 97, 100
See application file for complete search history.

(56) References Cited

U.S. PATENT DOCUMENTS

| | | | | |
|---|---|---|---|---|
| 2,096,283 A | * | 10/1937 | Lane .......................... | D06C 3/04 26/79 |
| 2,285,820 A | * | 6/1942 | MacKnight ............... | D06C 3/00 26/79 |
| 4,807,336 A | * | 2/1989 | Yoshimura .............. | B29C 55/20 26/71 |
| 5,402,556 A | * | 4/1995 | Rutz ..................... | B29C 55/165 26/73 |
| 7,322,078 B2 | | 1/2008 | Marchante Moreno et al. | |
| (Continued) | | | | |

FOREIGN PATENT DOCUMENTS

| | | | | |
|---|---|---|---|---|
| JP | 5949939 A | * | 3/1984 | ............. B29C 49/00 |
| JP | 61178356 A | * | 8/1986 | |
| WO | 2004108395 A1 | | 12/2004 | |

OTHER PUBLICATIONS

Machine Translation of Abstract of JP 61178356 A.*
Machine Translation of JP5949939A.*

*Primary Examiner* — Matthew J Daniels
*Assistant Examiner* — Leith S Shafi
(74) *Attorney, Agent, or Firm* — Abel Law Group, LLP

(57) ABSTRACT

Disclosed is a dual tenter clip and table assembly for moving, by means of an endless chain consisting of alternating pairs of first chain links and pairs of second chain links rotatably connected by pins arranged in parallel to the plane of a rail and perpendicular to the direction of the endless chain's movement, a polymer material web on a stretching plant or stretching device for stretching said polymer material web at least in a transverse direction.

20 Claims, 6 Drawing Sheets

(56) References Cited

U.S. PATENT DOCUMENTS

2006/0180437 A1    8/2006  Marchante Moreno et al.
2007/0275183 A1*  11/2007  Hashimoto ............. B29C 55/06
                                                          428/1.2
2012/0038080 A1    2/2012  Sano et al.

* cited by examiner

DUAL TENTER CLIP AND TABLE ASSEMBLY AND TRANSVERSE SHEET STRETCHING PLANT COMPRISING SAME

CROSS-REFERENCE TO RELATED APPLICATIONS

The present application claims priority under 35 U.S.C. § 119 of European Patent Application No. 13 167 973.0, filed May 16, 2013, the entire disclosure of which is expressly incorporated by reference herein.

BACKGROUND OF THE INVENTION

Field of the Invention

The present invention relates to the technology of stretching material sheets or films, particularly stretching polymer material sheets or films, on stretching plants. Particularly, the present invention relates to the field of processes of stretching material sheets or films, particularly polymer material sheets or films, on such stretching plants in the transverse direction, and also relates to devices improving the transverse stretching of polymer material sheets or films, which devices form part of the overall stretching plant.

Discussion of Background Information

The first step of an overall process of fabricating oriented films comprising polymer materials is an extrusion, through a die, of a film of a molten polymer onto a roll ("chill roll"), the surface of which is kept at a temperature below the glass transition temperature of the respective polymer. The roll surface quenches the polymer into an amorphous state.

A subsequent step of said process comprises steps of stretching the film previously generated by well-known methods in the longitudinal (machine) direction and/or in the transverse direction, the latter being a stretching step in a direction perpendicular to the machine direction, commonly. These stretching steps may be performed one after the other or may be performed simultaneously, or even only one stretching step may be performed, e. g. in the transverse direction.

In the case of sequential stretching, the stretching process itself is carried out by two machine units, usually first in the longitudinal/machine direction (i. e. in the direction of the travelling path of the polymer film on the stretching device) and then in the transverse direction. In the case of simultaneous stretching, a stretching action in the longitudinal (machine) direction and transverse direction needs the simultaneous application of stretching forces to the film material in two directions (usually perpendicular to each other), while the film is moving with high speed along a moving path of the film on a stretching plant or stretching device. The polymer film is moved along a longitudinal path on said stretching plant or stretching device by carriages, a large number of which are fixed to, and drawn by, endless chains to run on rails on both sides of said longitudinal path either on wheels or on gliding members between the carriages and the rails. Two opposite lateral edges of the polymer film are fixed to said two opposite carriages on tenter tables by means of clamps, said carriages stretching the polymer film in the longitudinal direction and—as the case may be—stretching the film also—or exclusively—in the transverse direction.

Once the drawing step(s) is/are completed, the drawn polymer film is "heat set" or crystallized under tension and with a temperature gradient starting at elevated temperatures and continuing to decreased temperatures. The heat setting step prevents the film from shrinking back to its unstretched shape and "locks" the molecular orientation in the polymer film plane. The orientation of the polymer molecule chains thus obtained is responsible for the high strength and stiffness of the oriented film.

Together with the molecular orientation, the formation of polymer crystal nuclei is induced. The crystallites grow rapidly and reach the boundary of neighbouring crystallites. Their size is smaller than the wavelength of the visible light. As a result, oriented polymer films have an excellent clarity, despite the semi-crystalline structure of the polymer units. Particularly, polymer films obtained by simultaneous biaxial stretching have excellent mechanical and optical properties and, hence, are highly valued.

At the end of the stretching and heat-setting areas of the stretching plant or stretching device, the clamps fixing both lateral edges of the polymer film on the tenter tables of the carriages release the film from the tenter tables, and the film produced and stretched is coiled on a film storage roll or is further processed, while the carriages with their clamps released from the tenter tables return to the starting point of the stretching process for another stretching cycle.

Presently, stretching plants or stretching devices for transversely stretching polymer films are in operation. Such plants or devices are described in the document WO-A 2004/108,395, the entire disclosure of which is incorporated by reference herein, which relates to polymer sheet stretching systems using a series of gripping means for the support, transport and drawing of a polymer film to be stretched.

Such gripping means are supported and guided by rails and driven by endless chains. Each chain is driven by two toothed wheels of large diameter, one wheel being located at the beginning of the forward run and the other wheel being located at the rear end of the return run of the chain. Each wheel is provided with motorised rotational drive means, said drive means being synchronised with each other. Such a drive device finds application in high speed drawing machines.

These stretching plants or stretching devices of the prior art have the drawbacks that, particularly in the case where the carriages are driven by the endless chains on wheels moving on the rails 60 (see FIG. 1), there is only one long tenter table with its clip fixing the polymer web per every two chain links. Hence, the tenter table is fixed to one chain link and extends almost over the whole next chain link. Herein the term "chain link" is used in the present claims and specification to ads dress the outer plates ("outer chain links 51") of the endless chains 50 and inner plates ("inner chain links 52") connecting the centers of two consecutive pins 53 defining the chain links' rotational axis, as is exemplarily shown in FIGS. 1A and 1B. In FIG. 1B, the chain pitch, i.e. the distance between the centers of two consecutive pins 53 defining the chain links' rotational axis, is indicated to be "P". The one long tenter table extending over almost two chain links, having a length of slightly shorter than 2 P (wherein "P" is the pitch as defined above) and fixing the polymer web by means of the one clip creates a certain rigidity of the polymer web fixation, resulting often in wrinkles of the polymer web generated in the process of stretchingly moving the web. Such wrinkles deteriorate the stretched polymer web's quality and, hence, are not desired.

It was surprisingly found that the drawbacks of the prior art can be overcome by providing dual tenter clips and connected tenter tables on a wheel-guided clip carriage assembly comprising a main clip body and a secondary clip body. Thereby, the table length could be reduced, preferably to almost 50% of the length of tenter tables of the prior art. Moreover, a greater flexibility of the polymer web movement could be achieved for the stretching step, accompanied by a safer fixation of the moving polymer web to the respective shorter tenter table for the stretching step(s). Hence, the appearance of wrinkles could be reduced and even prevented completely.

SUMMARY OF THE INVENTION

The present invention provides a dual tenter clip and table assembly (10) for moving, by means of an endless chain (50) consisting of alternating pairs of first or outer chain links (51) and pairs of second or inner chain links (52) rotatably connected by means of pins (53) arranged in parallel to the plane of the rail (60) and perpendicular to the direction of the endless chain's movement, a polymer material web (100) on a stretching plant or stretching device for stretching said polymer material web (100) at least in a transverse direction (T), said assembly comprising a main clip body (20) comprising a main clip body carriage (22) having a plurality of wheels (24a, 24b, . . . ) moving the carriage (22) along a rail (60) by means of said endless chain (50) to which the carriage (22) of the main clip body (20) is fixed;

said carriage (22) of the main clip body (20) further comprising a tenter table (26) onto which the polymer material web (100) to be stretched is fixed by a tenter clip (28); and said carriage (22) of the main clip body (20) being fixed to a first chain link (51) of the endless chain (50) by means of a vertical pin (29) positioned in parallel to the pins (53) connecting first and second chain links (51, 52) and passing through at least one structural part of the main clip body (20);

and said assembly further comprising a secondary tenter clip body (30) comprising a secondary clip body carriage (32), said carriage (32) of the secondary tenter clip body (30) further comprising a tenter table (36) onto which the polymer material web to be stretched is fixed by a tenter clip (38); and said carriage (32) of the secondary tenter clip body (32) being fixed to a second chain link (52) of the endless chain (50) by means of a vertical pin (39) positioned in parallel to the pins (53) connecting first and second chain links (51, 52) and passing through at least one structural part of the secondary tenter clip body (30);

wherein outer walls of said carriage (32) of the secondary tenter clip body (30) on both sides opposite to outer walls of one or two adjacent main clip body carriage(s) (22) are shaped in a manner preventing a contact of said outer walls of the secondary tenter clip body carriage (32) to said outer walls of one or two adjacent main tenter clip body carriages (22).

Preferred embodiments of the dual tenter clip and table assembly of the invention are set forth hereinbelow and in the appended claims.

The present invention further provides a transverse sheet stretching plant (200) for stretching a polymer material web (100) at least in a transverse direction, said plant comprising at least one element for providing a polymer material web (100) to be subjected to a stretching action at least in the transverse direction;

at least one element for adjusting the temperature of the polymer material web (100) provided in the previous step;

a stretching plant or stretching device capable of stretching a polymer material web (100) at least in a transverse direction, said stretching plant or stretching device comprising a longitudinal path allowing a polymer material web (100) to pass along during the stretching step, a plurality of dual tenter clip and table assemblies (10) according to the detailed description of the invention below and capable of gripping the polymer material web (100) to be stretched, fixedly moving it along the longitudinal path and thereby stretching it, before the polymer material web (100) is released for storage or further processing, rails on both sides of the longitudinal path allowing said dual tenter clip and table assemblies (10) to run on, while being moved by endless chains along said longitudinal path and, after a release of the polymer material web (100) after the termination of the stretching step, back to the start of the stretching step; and at least one element for storing the polymer material web (100), or transmitting the stretched polymer material web (100) for further processing, after the previous stretching step on said stretching plant or stretching device (200).

The present invention also provides a process for stretching a polymer material sheet (100) at least in a transverse direction, said process comprising providing a polymer material web (100) to be subjected to a stretching action at least in the transverse direction;

feeding said polymer material web (100) provided in the previous step into the stretching path of a stretching plant or stretching device;

adjusting the temperature of the polymer material web (100) fed in the previous step;

feeding the polymer material web (100) the temperature of which was adjusted in the previous step into a stretching plant or stretching device capable of stretching a polymer material web (100) at least in a transverse direction, said stretching plant or stretching device comprising a longitudinal path allowing a polymer material web (100) to pass along during the stretching step, a plurality of dual tenter clip and table assemblies (10) according to the detailed description of the invention below and capable of gripping the polymer material web (100) to be stretched, fixedly moving it along the longitudinal path and thereby stretching it, before the polymer material web (100) is released for storage or further processing, rails on both sides of the longitudinal path allowing said dual tenter clip and table assemblies (10) to run on, while being moved by endless chains along said longitudinal path and, after a release of the polymer material web (100) after the termination of the stretching step, back to the start of the stretching step; and storing the polymer material web (100), or transmitting the stretched polymer material web (100) for further processing, after the previous stretching step on said stretching plant or stretching device (200).

BRIEF DESCRIPTION OF THE DRAWINGS

The invention is now further described in detail by referring to the appended drawings. The drawings show preferred embodiments of the invention, which are to provide a better understanding of the invention, but should not be construed to limit the invention.

In the drawings.

DETAILED DESCRIPTION OF THE PRESENT INVENTION

Figure 1A:
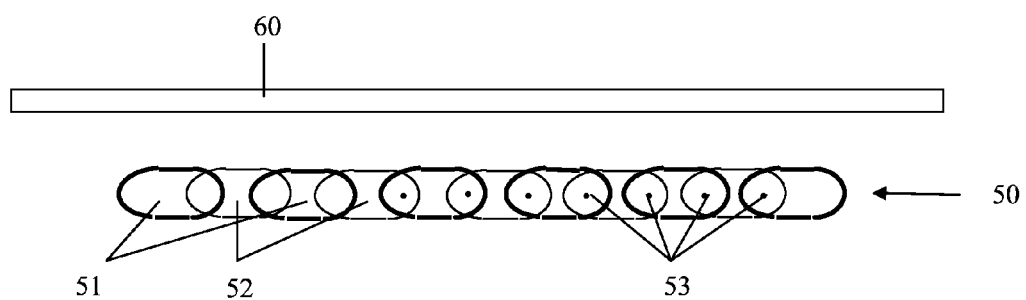
FIG. 1A shows a top view of a common configuration, in a stretching plant or stretching device, of the rail, on which carriages carrying a tenter table and a tenter clip are moved, and of the endless chain by means of which the movement of said carriages is effected.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

The terms "comprise", "comprises" or "comprising" as used in the present specification and claims, for example in claim 1, has/have the meaning that the dual tenter clip and table assembly of the invention, or the transverse sheet stretching plant of the invention, or the process of the invention may comprise (i) one means or steps or may comprise (ii) two or more means or steps as mentioned in, for example, claim 1, or that (iii) further components, means, process steps etc. (more specifically defined below) may also be comprised by the assembly, plant or device or process of the invention.

The terms "comprise", "comprises" or "comprising" as used in the present specification and claims may, however, also include cases where the dual tenter clip and table assembly of the invention, or the transverse sheet stretching plant of the invention, or the process of the invention mainly consists of (i) at least one means or steps or mainly consists of (ii) two or more means or steps mentioned, for example, in claim 1, optionally together with any necessary component or means or process steps a skilled person may include into such an assembly or plant or device or process in order to achieve the object of the invention, or may even include cases where the assembly or plant or device of the invention exclusively consists of (i) at least means or step or exclusively consists of (ii) two or more means or steps, optionally, but not necessarily, together with any necessary component, means, process step etc. a skilled person may include into such an assembly or plant or device or process in order to achieve the object of the invention. Particularly in the latter case where the terms "comprise", "comprises" or "comprising" as used in the present specification and claims may have the meaning of an "exclusively consisting of", dependent claims of the present application may claim, and corresponding parts of the specification may describe, further preferred embodiments, which are characterized by additional specified features which, in combination with the features of the independent claim and corresponding parts of the description, are summarized to belong to the invention as described in its broadest scope claimed.

In other words: The terms "comprise" or "comprises" or "comprising" may have, in the present specification and claims, the meaning of describing a non-exhaustive enumeration of elements or, alternatively, may have, in the present specification and claims, the meaning of describing an exhaustive enumeration of elements, in the latter case without excluding further preferred embodiments being characterized by additional features.

Figure 1B:
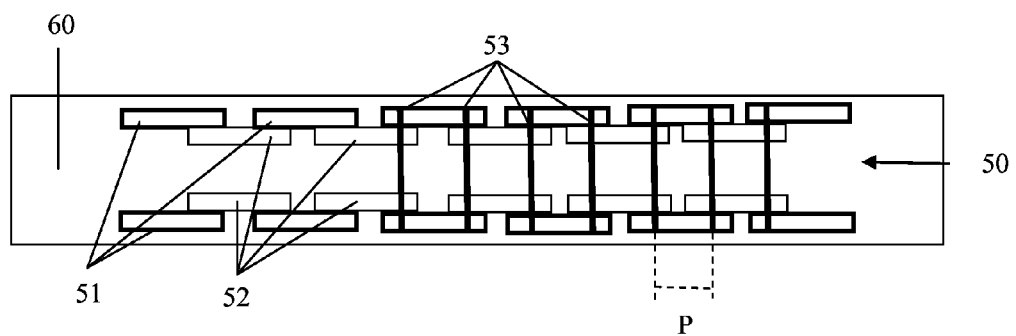
FIG. 1B shows a side view of said same configuration shown in FIG. 1A, especially showing the alternating pairs of first/outer chain links and pairs of second/inner chain links of the endless chain.
Figure 2:
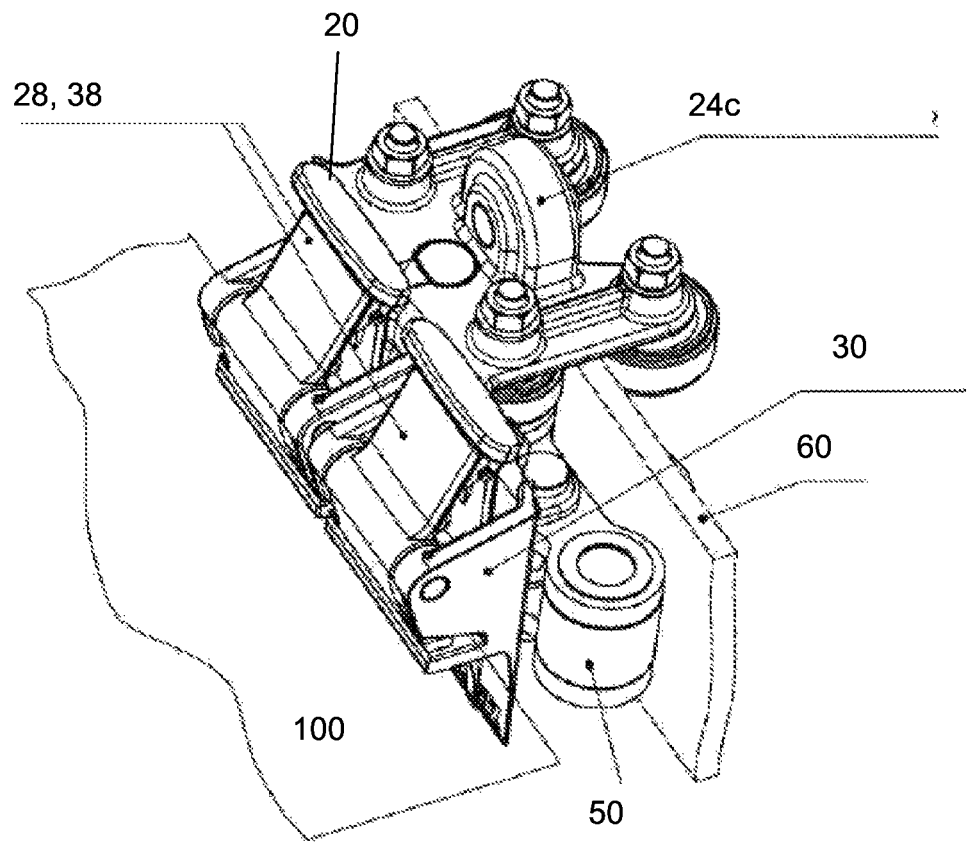
FIG. 2 shows a perspective view of one preferred embodiment of a dual tenter clip and table assembly of the invention as moved along the rail by means of the endless chain in the course of drawing a polymer material web.

Reference is now made to FIGS. 1A, 1B and FIG. 2. In FIGS. 1A and 1B, the first chain links 51 of the endless chain 50 are shown in bold lines in order to (optically and in the FIG.s) distinguish them from the second chain links 52 of the endless chain 50, which are shown in commonly printed lines.

FIG. 1A shows a top view of a common configuration, in a stretching plant or stretching device, of the rail 60, on which carriages carrying a tenter table and a tenter clip are moved, and of the endless chain 50 by means of which the movement of said carriages is effected. In FIG. 1A, the pins connecting consecutive pairs of first links 51 and second links 52 in a rotatable manner are shown to have the reference numeral "53". These connecting pins 53 are positioned in parallel to the plane of the rail 60 and perpendicular to the direction of movement of the endless chain 50 in holes close to the upstream and downstream ends of each of the chain links 51, 52.

In FIGS. 1A and 1B, the pins 53 connecting the consecutive pairs of outer and inner chain links 51, 52 in a rotatable manner (i. e. allowing a rotation of first chain link around the pin 53 connecting the first chain link to the second chain link) are shown at the right side part of the endless chain segment shown in FIGS. 1A and 1B, only, while the pins are omitted for reasons of clarity of the FIGs at the respective left side parts of the chain segments shown in FIGS. 1A and 1B.

FIG. 1B shows a side view of said same configuration as in FIG. 1A, especially showing the alternating pairs of first chain links 51 and pairs of second chain links 52 of the endless chain 50 exemplarily. In accordance with the present invention, chain links 51 indicated above to be "the first chain links" may be the "outer" chain links, while chain links 52 indicated to be "the second chain links" may be the "inner" chain links. Alternatively, and also in accordance with the invention, but not shown in FIG. 1B, chain links 51 indicated above to be "the first chain links" may be the "inner" chain links, while chain links 52 indicated to be "the second chain links" may be the "outer" chain links. It is preferred in the present invention that chain links 51 indicated above to be "the first chain links" are the "outer" chain links, while chain links 52 indicated to be "the second chain links" are the "inner" chain links, and the invention is described below on the basis of said preferred embodiment.

The terms "outer" and "inner" relate, in this connection, to a view along the endless chain 50 when moving along the rail 60: A pair of first, or outer, chain links 51 (shown in FIG. 1B) take the uppermost and lowermost positions of chain links in the course of the endless chain 50, while a pair of second, or inner, chain links 52 take an intermediate position between the two first/outer chain links 51.

FIG. 2 shows a perspective overall view of one preferred embodiment of a dual tenter clip and table assembly 10 of the invention as moved along the rail 60 by means of the endless chain 50 in the course of drawing a polymer material web 100 at least in the transverse direction, which is the direction perpendicular to the rail 60.

From FIG. 2, one preferred embodiment of the invention as described below can be seen in detail, which embodiment is shown schematically also in FIGS. 3 and 5a: The main tenter clip body carriage 22 is moved along the rail 60 while running on wheels. These wheels have a larger diameter on the side of the rail 60 which is opposite to the side on which the main tenter body carriage 22 has the tenter clip 28 and the tenter table 26. The advantage of such an embodiment is that such large diameter wheels may easily bear the forces resulting from the stretching step on the opposite side of the rail 60, while the smaller diameter wheels on the side of the rail where the stretching step is conducted serve a smooth guiding of the main tenter clip body carriage 22. In addition, cost savings and a lower weight of this embodiment may be advantageous.

Figure 3:
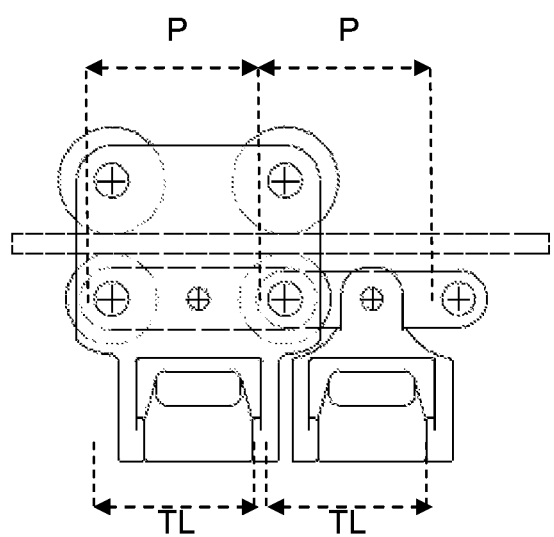
FIG. 3 shows a top view of the same preferred embodiment of a dual tenter clip and table assembly of the invention as shown in FIG. 2, wherein the pitch P (i. e. the distance between the centers of two consecutive pins 53 defining the chain links' rotational axis) and the tenter table length TL are exemplarily shown.

FIG. 3 shows a top view of the same preferred embodiment of a dual tenter clip and table assembly of the invention as shown in FIG. 2. In FIG. 3, the pitch P (i. e. the distance between the centers of two consecutive pins 53 defining the chain links' rotational axis) and the tenter table length TL are exemplarily shown.

As is known from the prior art, the tenter table to which the polymer material web 100 was fixed for stretching by means of tenter clips, had a length extending almost over two chain links. Hence, one tenter table had a length of almost 2P or, in specific embodiments, exactly, 1.5 P to 1.96 P. This caused problems particularly in cases where tenter tables holding attached the edge of a polymer material web had to be moved around curves along the path of the polymer film during the stretching step: Often wrinkles were observed in the polymer film, thereby deteriorating the polymer film's optical and strength quality.

As can be seen from FIG. 3, one tenter table of the dual tenter clip and table assembly 10 according to the invention has a length (tenter table length TL) of slightly less than 1P (wherein P is the pitch of the endless chain 50), more preferably from 0.75 P to 0.98 P (i. e. 0.75 P≤TL≤0.98 P), and even more preferably from 0.90 P to 0.94 P (i. e. 0.90 P≤TL≤0.94 P).

In accordance with the invention, the tenter table length of the main tenter clip body tenter table 26 may be identical to or different from the tenter table length of the secondary tenter clip body tenter table 36. In preferred embodiments of the invention, the tenter table length of the main tenter clip body tenter table 26 is identical to the tenter table length of the secondary tenter clip body tenter table 36.

Figure 5A:
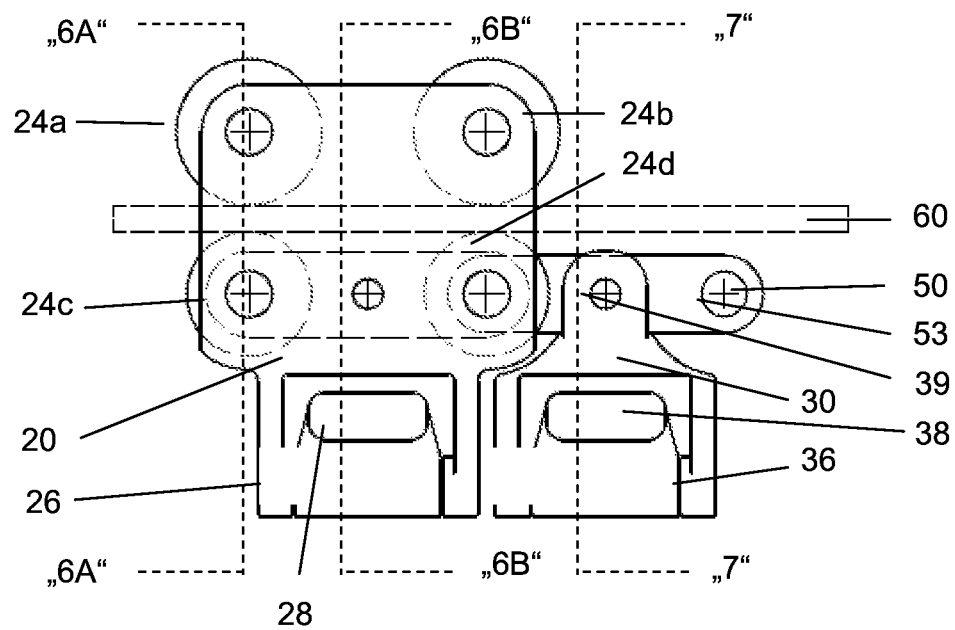
FIG. 5A shows a top side plan view of the dual tenter clip and table assembly 10 of the invention, said view being similar to the view of FIG. 3, but also showing, by two broken lines indicated with "6A" and "6B" and "7", the positions of sectional views of the dual tenter clip and table assembly 10 of the invention as shown in FIGS. 6A, 6B and 7.

FIG. 5A shows a top side plan view of the dual tenter clip and table assembly 10 of the invention, said view being similar to the view of FIG. 3.

Figure 7:
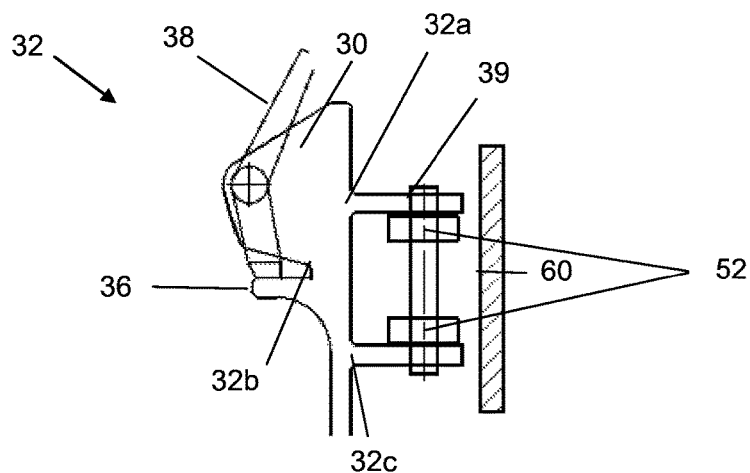
FIG. 7 shows a sectional plan view of the secondary tenter clip body part of FIG. 5A at "7"
Figure 6A:
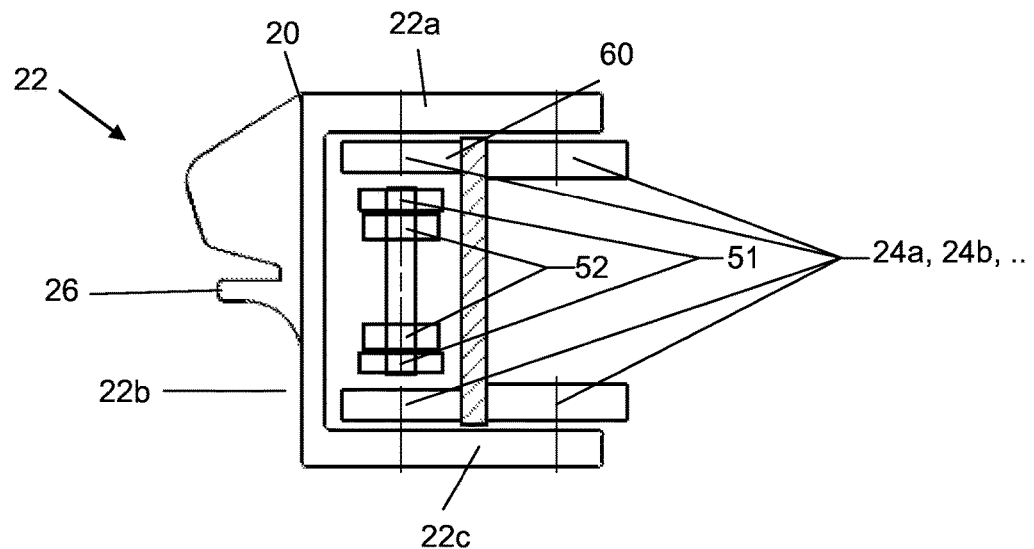
FIG. 6A shows a sectional plan view of the main tenter clip body part of FIG. 5A at "6A"
Figure 6B:
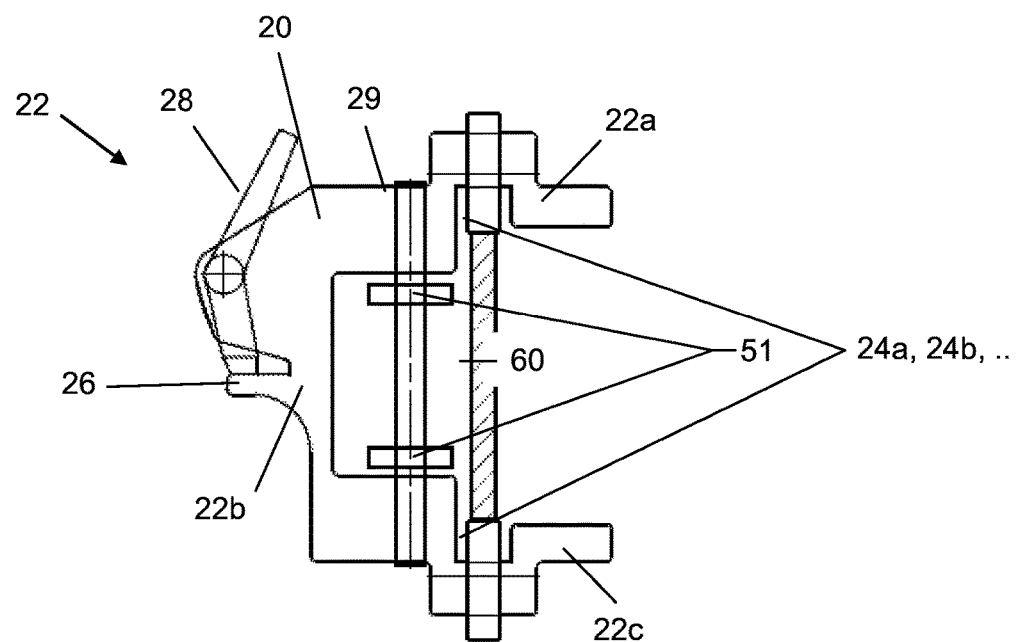
FIG. 6B shows a sectional plan view of the main clip body part of FIG. 5A at "6B"

FIG. 6A, FIG. 6B and FIG. 7 show several sectional plan views of the main tenter clip body part of FIG. 5A at "6A" and "6B" and of the secondary tenter clip body part of FIG. 5A at "7".

As can be seen from FIGS. 2, 3, 5A, 6A, 6B and 7, the dual tenter clip and table assembly 10 of the present invention comprises a main tenter clip body 20. The main tenter clip body comprises a main tenter clip body carriage 22 having a plurality of wheels 24a, 24b, . . . 24n (wherein n=alphabet letter>letter "b", e.g. letters "c", "d", "e", "f", "g", "h", "I" and "j"). The wheels 24a, 24b, 24c, . . . 24n are capable of moving the main tenter clip body carriage 22 along a rail 60. The movement of all main tenter clip body carriages 22 and secondary tenter clip body carriages 32 is effected by means of said endless chain 50, to which the main tenter clip body carriage 22 and the secondary tenter clip body carriage 32 are fixed.

In other words: The dual tenter clip and table assembly 10 of the invention is guided on a plurality of wheels 24a, 24b, 24c, . . . along the rail 60 and is moved forward along the rail 60 by an endless chain 50 driven, in a conventional manner, by suitable driving wheels around which the endless chains 50 are promoted. The chain 50 with its first and second, (e. g. outer and inner) chain links 51, 52 rotatably connected to each other by vertical pins 53 is capable of engaging with the sprockets of the driving wheels, thereby bringing about a controllable movement of the endless chain 50 and, simultaneously, of the dual tenter clip and table assembly 10 of the invention.

In accordance with the invention, all wheels of said plurality of wheels 24a, 24b, 24c, . . . , on which the dual tenter clip and table assembly 10 of the invention is guided along the rail 60 are mounted to the main tenter clip body carriage 22.

There may be wheels 24a, 24b, . . . , contacting the rail 60 in a position having the wheel's rotational axis arranged vertically, and/or there may be wheels 24c, 24d, . . . , contacting the rail 60 in a position having the wheel's rotational axis arranged horizontally. In preferred embodiments of the invention, the movement of the main tenter clip body carriages 22 is effected on both types of wheels, those with a vertical and those with a horizontal rotational axis.

Figure 4:
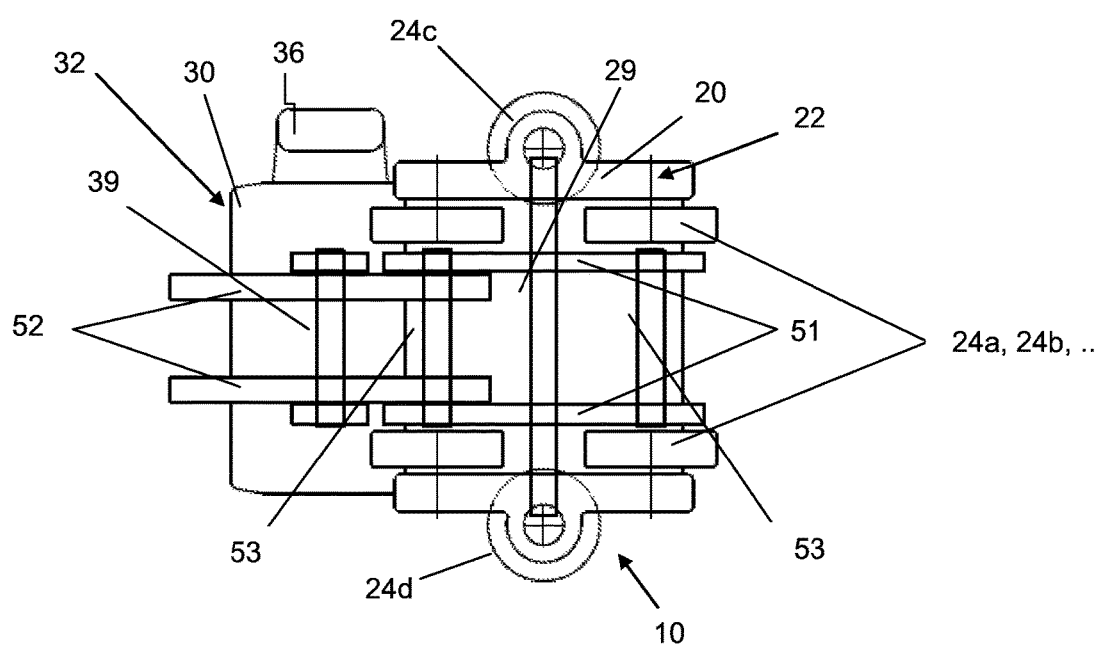
FIG. 4 shows a perspective backside view of the dual tenter clip and table assembly 10 of the invention, and particularly showing the fixation of the main tenter clip body 20 to the first chain links 51 of the endless chain 50 and the fixation of the secondary tenter clip body 30 to the second chain links 52 of the endless chain 50.

In a particularly preferred embodiment of the invention, the main tenter clip body carriages 22 are run on a number of up to ten wheels, even more preferred are run on a number of nine wheels the majority of which are wheels having vertical rotational axes and are arranged in direct contact with the rail 60 on the rail's two vertical surfaces. Even more preferred and as can be learnt from FIG. 2, there is a quartet of upper horizontal wheels and a quartet of lower horizontal wheels opposite the quartet of upper horizontal wheels. In contrast, the ninth wheel (FIGS. 2, 4: 24c) is rotating around a horizontal rotational axis along the edge of the rail 60, as does a tenth wheel (FIG. 4: 24d). The latter lower wheel 24d is found at a restricted number of main tenter clip body carriages 22, only, for example at every fifth main tenter clip body carriage 22 and is moving under the lower edge of the rail 60 and serves keeping the carriage 22 on track.

In accordance with the invention, the forward movement forces are transmitted to the main tenter clip body carriage 22 by its fixation, by a vertical pin 29, to the first chain link 51 of the endless chain 50 (e. g. as shown in the FIG.s: to the outer chain link 51 of the endless chain 50). It is also possible that the forward movement forces exerted by the chain 50 are transmitted to the main tenter clip body carriage 22 by its fixation, by a vertical pin 29, to an inner chain link 52 of the endless chain 50 (which embodiment is not shown in the FIGs).

In contrast to the main tenter clip body carriage 22, the secondary tenter clip body carriage 32 is not moving on wheels guided along the rail 60, but is moving due to its fixation to the second chain link 52 of the endless chain 50, only. Also in the case of the secondary tenter clip body carriage 32, the fixation to the endless chain 50, in this case to the second chain links 52, or inner chain links 52, of the endless chain 50, is effected by a vertical pin 39, in a manner similar to the fixation of the main tenter clip body carriage 22 to the first chain links 51.

In the alternative case that (as mentioned above) the forward movement forces exerted by the chain 50 are transmitted to the main tenter clip body carriage 22 by its fixation, by a vertical pin 29, to a second/an inner chain link 52 of the endless chain 50, the forward movement forces exerted by the chain 50 are transmitted to the secondary tenter clip body carriage 32 by its fixation, by a vertical pin 39, to a first/an outer chain link 51 of the endless chain 50.

In preferred embodiments of the invention, the forward movement forces are transmitted to the main tenter clip body carriage 22 by its fixation, by a vertical pin 29, to the first, or outer, chain link 51 of the endless chain 50 (e. g. as shown in the FIGs), while the forward movement forces are transmitted to the secondary tenter clip body carriage 32 by its fixation, by a vertical pin 39, to the second chain link 52 of the endless chain 50 (e. g. as shown in the FIGs: to the inner chain link 52 of the endless chain 50)

In preferred embodiments of the invention, due to the—usually—lower weight of the secondary tenter clip body 30, the vertical fixation pin 39 may be smaller than the vertical pin 29 used for the fixation of the main tenter clip body 20 to the outer chain links 51 of the endless chain 50. This is, however, not restricting the invention.

According to the invention and as shown in FIGS. 2, 3, 5A, 6A, 6B and 7, said carriage 22 of the main tenter clip body 20 further comprises a tenter table 26 onto which a polymer material web 100 or polymer film 100 to be stretched is fixed by at least one tenter clip 28 and preferably one tenter clip 28. The person skilled in this technical field may freely select the position of the tenter table 26 and tenter clip(s) 28 in accordance with specific requirements of the case. In preferred embodiments of the dual tenter clip and table assembly 10 of the present invention, the tenter table 26 and the (preferably one) tenter clip 28 are located on the side of the main clip body carriage 22 which is opposite to the "rail" side of said carriage 22, thereby allowing a stable fixation of the polymer material web 100 or polymer film 100 to the mail tenter clip body carriage 22 in the course of the stretching step.

As another element, the dual tenter clip and table assembly 10 of the present invention further comprises a secondary tenter clip body 30. The secondary tenter clip body 30 comprises a secondary tenter clip body carriage 32 which is moved along the rail 60 by means of the endless chain 50 to which the secondary tenter clip body carriage 32 is fixed.

According to the invention and as shown in FIG. 2, said carriage 32 of the secondary tenter clip body 30 further comprises a tenter table 36 onto which a polymer material web 100 or polymer film 100 to be stretched is fixed by at least one tenter clip 38, preferably by one tenter clip 38. The person skilled in this technical field may freely select the position of the tenter table 36 and tenter clip(s) 38 in accordance with specific requirements of the case. In preferred embodiments of the dual tenter clip and table assembly 10 of the present invention, the tenter table 36 and the tenter clip(s) 38 are located on the side of the secondary tenter clip body carriage 32 which is opposite to the "rail" side of said carriage 32, thereby allowing a stable fixation of the polymer material web 100 or polymer film 100 to the secondary tenter clip body carriage 32 in the course of the stretching step, too.

In the present specification and claims, the terms "main" and "secondary" in combination with the respective tenter clip bodies 20, 30 should not be construed to imply that either of these has a major or minor importance for the functions of the invention. These terms are selected simply for distinguishing the two tenter clip bodies 20, 30 and might imply that, preferably, the former one has a (relatively) larger overall size and/or weight, and the latter one has a (relatively) smaller overall size and/or weight. Both of these tenter clip bodies 20, 30 are of eminent importance for the functions of the present invention.

As can be derived from the further detailed description of the present invention and its essential and preferred embodiments, the dual tenter clip and table assembly 10 of the invention is for moving a polymer material web 100 or polymer film 100 on a stretching plant or stretching device for stretching said polymer material web 100 or polymer film 100 at least in a transverse direction T, which is the direction perpendicular to the rail 60. Such moving of the polymer material web 100 or polymer film 100 for stretching is effected by means of an endless chain 50. As shown in FIGS. 1A and 1B, said endless chain 50 consists of consecutively arranged alternating pairs of first chain links 51 and pairs of second chain links 52. In preferred embodiments of the invention, the above first chain links are the outer chain links 51 in the sense defined above, while the above second chain links are the inner chain links 52 in the sense defined above. All said chain links are rotatably connected to each other by means of pins 53 arranged in parallel to the plane of the rail 60 and perpendicular to the direction of the endless chain's movement.

By using the above term "stretching said polymer material web 100 at least in a transverse direction", is intended to address that, with the dual tenter clip and table assembly 10 of the invention, a step of stretching the polymer material web 100 in a transverse direction (i. e. in a direction substantially perpendicular to the rail 60) is carried out in any case. This should, however, not exclude that the polymer material web 10 is subjected to a stretching step or to stretching steps in the longitudinal direction separately, e. g. before and/or after said transverse direction stretching step with the dual tenter clip and table assembly 10.

A skilled person knows, from the prior art and his own technical knowledge, means for driving the endless chains 50 along the path of the polymer material web 100 or polymer film 100. Hence, a skilled person may select such driving means in accordance with the specific requirements of the case. In preferred embodiments, the endless chains 50 are driven by wheels positioned suitably at the entrance of the stretching plant or stretching device and at the exit of the stretching plant or stretching device at suitable points. In accordance with the teaching of the prior art, the speeds by which the wheels driving the endless chains are circulated are adapted suitably and may be equal or may be different.

FIGS. 2 and 4 show, in perspective and plan back side views, the dual tenter clip and table assembly 10 and, specifically show how a main tenter clip body 20 is fixed to the first/outer chain links 51 of the endless chain 50 and how a secondary tenter clip body 30 is fixed to the second/inner chain links 52 of the endless chain 50.

In accordance with the invention, and as shown best in FIGS. 2 and 4, but as may also be seen from FIGS. 5A, 6B and 7, the carriage 22 of the main tenter clip body 20 is fixed to a first/an outer chain link 51 of the endless chain 50 by means of a vertical pin 29. Such a vertical pin 29, in accordance with the invention, is positioned in parallel to the pins 53 connecting first and second/outer and inner chain links 51, 52 of the endless chain 50 and is passing through at least one structural part of the main tenter clip body 20.

The vertical pin 29 may be fixed to the first/outer chain links 51 of the endless chain by means known to a person skilled in this technical field. Hence, the skilled person may select such means in accordance with the specific requirements of the case. For example, the fixation may be achieved by means of bolts screwed to the ends of the vertical pins 29. However, each suitable fixation method may be applied, as long as it results into a secure fixation of the main tenter clip body 20 to the first/outer chain links 51.

Such a fixation of the main tenter clip body 20 with its carriage 22 to the first/outer chain links 51 of the endless chain has the advantage that, due to the flat faces of the outer links 51 of the endless chain 50, the main tenter clip body 20 and its carriage 22 is prevented from rotating around the longitudinal axis of the vertical pin 29, thereby securing the position of the main tenter clip body 20 and its carriage 22 and achieving a uniform stretching of a polymer material web 100 or polymer film in the whole stretching step.

In accordance with the invention, and as shown best in FIGS. 2 and 4, but may also be seen from FIGS. 5A, 6B and 7, the carriage 32 of the secondary tenter clip body 30 is fixed to a second/an inner chain link 52 of the endless chain 50 by means of a vertical pin 39. Such a vertical pin 39, in accordance with the invention, is positioned in parallel to the pins 53 connecting first and second/outer and inner chain links 51, 52 of the endless chain 50 and is passing through at least one structural part of the secondary tenter clip body 30.

The vertical pin 39 may be fixed to the second/inner chain links 52 of the endless chain 50 by means known to a person skilled in this technical field. Hence, the skilled person may select such means in accordance with the specific requirements of the case. For example, the fixation may be achieved by means of bolts screwed to the ends of the vertical pins 39. However, each suitable fixation method may be applied, as long as it results into a secure fixation of the secondary tenter clip body 30 to the second/inner chain links 52.

Such a fixation of the secondary tenter clip body 30 with its carriage 32 to the second/inner chain links 52 of the endless chain 50 has the advantage that the secondary tenter clip body 30 and its carriage 32 is prevented from rotating around the longitudinal axis of the vertical pin 39, thereby securing the position of the secondary tenter clip body 30 and its carriage 32 and achieving a uniform stretching of a polymer material web 100 or polymer film in the whole stretching step.

FIGS. 6A and 6B (being sectional views of the main tenter clip body area of the dual tenter clip and table assembly 10 of the invention as shown in FIG. 5A at "6A" and "6B") show that, in a preferred embodiment of the invention, the main tenter clip body carriage 22 has an approximate shape of its section, seen in the direction of the carriage movement along the rail 60, of a letter "C".

The "upper arm" 22a, "back" 22b and "lower leg" 22c of the approximate letter "C" shape of the main tenter clip body carriage 22 as shown in FIGS. 6A and 6B in detail are positioned, in a preferred embodiment of the invention, in a perpendicular position relative to each other and are capable securing an enhanced rigidity of the main tenter clip body 20 in the course of the stretching step.

In a further preferred embodiment of the invention, the "upper arm" 22a and the "lower leg" 22c of the main tenter clip body carriage's letter "C" shape provide a support for a fixation, by means of said vertical pin 29, of the main tenter clip body carriage 22 to the first/outer chain links 51 of the endless chain 50. Such support for the fixation may be any support a skilled person in this technical field would provide and select in accordance with the conditions of the specific case. For example, the vertical pin 29 may be secured by guiding it through suitable holes in the first/outer chain links 51 and in the upper arm 22a and lower leg 22b of the approximate letter "C" shape main tenter clip body carriage 22 and then fixing the vertical pin 29, for example by suitable nuts. In such a manner, the main tenter clip body 20 is prevented from rotating around the vertical pin axis, thereby allowing a smooth stretching step.

In a further preferred embodiment of the present invention which may be realized separately or in combination with the fixation of the main tenter clip body carriage 22 to the first/outer chain links 51, the back part 22b of the main tenter clip body carriage's letter "C" may carry the tenter table 26 and the tenter clip 28. By such an arrangement, a smooth movement of the main tenter clip body carriage 22 along the rail can be effected, even when engaged with the polymer material web 100 during the stretching step.

FIG. 7 (being a sectional view of the secondary tenter clip body area of the dual tenter clip and table assembly 10 of the invention as shown in FIG. 5A at "7") shows that, in a preferred embodiment of the invention, the secondary tenter clip body carriage 32 has an approximate shape of its section, seen in the direction of the carriage movement along the rail 60, of a letter "C".

The "upper arm" 32a, "back" 32b and "lower leg" 32c of the approximate letter "C" shape of the secondary tenter clip body carriage 32 as shown in FIG. 7 in detail are positioned, in a preferred embodiment of the invention, in a perpendicular position relative to each other and are capable securing an enhanced rigidity of the secondary tenter clip body 30 in the course of the stretching step.

In a further preferred embodiment of the invention, the "upper arm" 32a and the "lower leg" 32c of the secondary tenter clip body carriage's letter "C" shape provide a support for a fixation, by means of said vertical pin 39, of the secondary tenter clip body carriage 32 to the secondary/inner chain links 52 of the endless chain 50. Such support for the fixation may be any support a skilled person in this technical field would provide and select in accordance with the conditions of the specific case. For example, the vertical pin 39 may be secured by guiding it through suitable holes in the second/inner chain links 52 and in the upper arm 23a and lower leg 32b of the approximate letter "C" shape secondary tenter clip body carriage 32 and then fixing the vertical pin 39, for example by suitable nuts. The position with the vertical pin 39 fixed to the inner chain links 52 and the upper arm 32a and lower leg 32c is best seen from FIG. 7. In such a manner, the secondary tenter clip body 30 is prevented from rotating around the vertical pin axis, thereby allowing a smooth stretching step.

In a further preferred embodiment of the present invention which may be realized separately or in combination with the fixation of the secondary tenter clip body carriage 32 to the second/inner chain links 52, the back part 32b of the secondary tenter clip body carriage's letter "C" may carry the tenter table 36 and the tenter clip 38. By such an arrangement, a smooth movement of the secondary tenter clip body carriage 32 along the rail can be effected, even without wheels and when the tenter table 36 and tenter clip 38 are engaged with the polymer material web 100 during the stretching step.

Figure 8A:
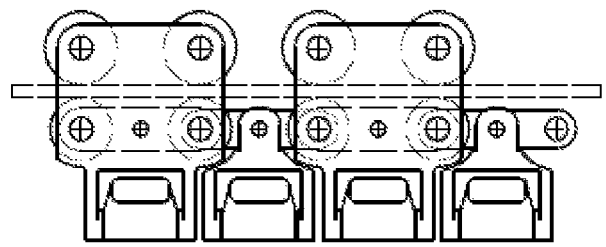
FIG. 8A shows a top side plan view of the dual tenter clip and table assembly 10 of the invention, where two pairs of the dual main tenter clip body-secondary tenter clip body assembly 10 are combined.
Figure 8B:
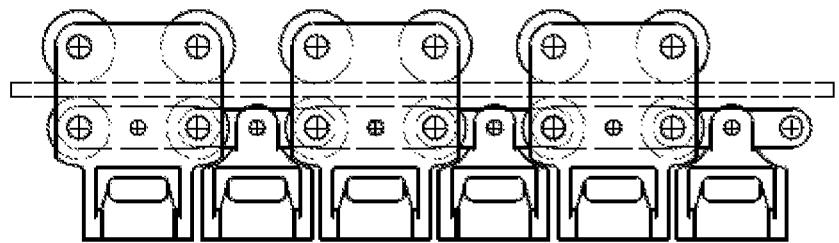
FIG. 8B shows top side plan view of the dual tenter clip and table assembly 10 of the invention, where three pairs of the dual main tenter clip body-secondary tenter clip body assembly 10 are combined.

FIGS. 8A and 8B show top side plan views of the dual tenter clip and table assembly 10 of the invention, where two pairs of the dual main tenter clip body-secondary tenter clip body assembly 10 (FIG. 8A) or three pairs of the dual main tenter clip body-secondary tenter clip body assembly 10 (FIG. 8B) are combined.

As can be seen from these FIGS. 8A and 8B and from FIGS. 3 and 5A as well, the main tenter clip body 20 and its carriage 22, on the one hand, and the secondary tenter clip body 30 and its carriage 32, on the other hand, are separate elements of the dual tenter clip and table assembly 10 of the present invention. They are connected to each other indirectly, only, i. e. via their respective fixation to the first/outer chain links 51 and second/inner chain links 52 of the endless chain 50. By such a configuration, a certain flexibility of the overall assembly 10 is achieved, due to the rotatable connection of the chain links 51, 52 of the endless chain 50. The result is a decrease and even minimization of a wrinkle formation of the polymer material web 100 in the course of the stretching step when the bodies comprising the tenter clips have to pass curvatures of the rails during the stretching step.

The latter is also applicable in view of the fact that, in accordance with preferred embodiments of the dual tenter clip and table assembly 10 of the invention, the tenter table length was shortened from values just below 2 P (wherein P is the pitch of the endless chain 50), specifically from values of 1.5 P to 1.96 P, to values of from 0.75 P to 0.98 P, even more preferably to values of from 0.9 P to 0.94 P. Also the shorter tenter table lengths minimize the wrinkle formation at the polymer material web 100 when the dual tenter clip and table assembly of the invention has to pass curves of the rails 50 in the course of the stretching step.

As can be seen from FIGS. 3, 5 and 8A and 8B, the outer walls of main tenter clip body carriages 22, in areas between the main and secondary tenter clip bodies 20, 30, and the outer walls of secondary tenter clip body carriages 32, in the same areas between the main and secondary tenter clip bodies 20, 30, approach each other closely in the course of the movement of the dual tenter clip and table assembly 10 along rail 60 during the stretching step. However, these outer walls of the two elements do not contact each other and are prevented from doing so.

This is effected by providing, in accordance with even more preferred embodiments of the present dual tenter clip and table assembly 10 of the invention, the outer walls of the main tenter clip body carriages 22 opposing the outer walls of the secondary tenter clip body carriages 32 and the outer walls of the secondary tenter clip body carriages 32 opposing the outer walls of the main tenter clip body carriages 22 to have an oppositely shaped curvature. This can be seen from FIGS. 3, 5A, 8A and 8B and, as an enlarged detail, in FIG. 5B.

Figure 5B:
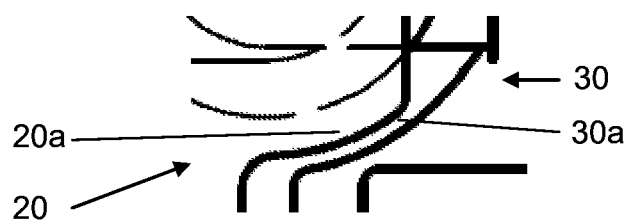
FIG. 5B shows an enlarged top side view of the dual tenter clip and table assembly 10 of the invention as shown in FIG. 5A, specifically of the area where the outer walls of the main tenter clip body 20 and the secondary tenter clip body 30 opposite to each other are closely adjacent.

FIG. 5B shows in enlarged detail that the outer walls 20a of the main tenter clip body carriages 22 opposing the outer walls 30a of the secondary tenter clip body carriages 32 and the outer walls of the secondary tenter clip body carriages 32 opposing the outer walls of the main tenter clip body carriages 22 to have an oppositely shaped curvature. By such an oppositely shaped curvature of the outer walls 20a, 30a of the two tenter clip bodies in the areas opposing each other, a contact between the walls, and thereby between the main tenter clip body carriage 22 and the secondary tenter clip body carriage 32 can be prevented.

Even more preferred is an embodiment of the dual tenter clip and table assembly of the invention, wherein a convex shape of the outer walls of the main tenter clip body carriages 22 and a concave shape of the opposing outer walls of the intermediate secondary tenter clip body carriages 32 are capable of preventing a contact of the outer walls of the secondary tenter clip body carriages 32 to the outer walls of the adjacent main tenter clip body carriages 22.

In a similar manner as in prior art polymer sheet stretching plants or stretching devices, the chains drawing the carriages and the wheels on which the carriages are running along the rails are lubricated with a suitable lubricant, e. g. a suitable oil. During operation of the plant or device, any risk that even a drop of the lubricant/oil is spilled onto the polymer sheet stretched has to be prevented: A lubricant/oil leakage creating lubricant/oil spots on the polymer sheet would be detrimental to the adhesion of layers applied to the stretched film in subsequent processing step, e. g. metal layers resulting into metallized films. In another preferred embodiment of the invention, a reliable prevention of spilling or leaking of even minor amounts of lubricant/oil from the chains or wheels to the polymer sheet is achieved by the walls which walls, even more preferably, are equipped with baffles to prevent lubricant/oil leakages.

The invention also relates to another preferred embodiment which may be realized in the dual tenter clip and table assembly separately or in combination with one or more of the other features explained above in detail, wherein the tenter clips 28, 38 capable of fixing the polymer material web 100 to be stretched on the tenter tables 26, 36 are capable of being actuated mechanically or electronically before the beginning or after the end of the stretching cycle. This feature is advantageous because the start and termination of the stretching cycle accompanied by the steps of grasping the polymer material web 100 at its edges and of releasing the polymer material web from the tenter clip bodies may be actuated automatically.

The invention also relates to a transverse sheet stretching plant or stretching device 200 for stretching a polymer material web 100 at least in a transverse direction, said plant comprising at least one means for providing a polymer material web 100 to be subjected to a stretching action at least in the transverse direction;

at least one means for adjusting the temperature of the polymer material web 100 provided in the previous step;

a stretching plant or stretching device capable of stretching a polymer material web 100 at least in a transverse direction, said stretching plant or stretching device comprising a longitudinal path allowing a polymer material web 100 to pass along during the stretching step, a plurality of dual tenter clip and table assemblies 10 according to the above detailed specification and capable of gripping the polymer material web 100 to be stretched, fixedly moving it along the longitudinal path and thereby stretching it, before the polymer material web 100 is released for storage or further processing, rails on both sides of the longitudinal path allowing said dual tenter clip and table assemblies 10 to run on, while being moved by endless chains 50 along said longitudinal path and, after a release of the polymer material web 100 after the termination of the stretching step, back to the start of the stretching step; and at least one means for storing the polymer material web 100, or transmitting the stretched polymer material web 100 for further processing, after the previous stretching step on said stretching plant or stretching device 200.

The invention also relates to a process for stretching a polymer material sheet 100 at least in a transverse direction, said process comprising providing a polymer material web 100 to be subjected to a stretching action at least in the transverse direction;

feeding said polymer material web 100 provided in the previous step into the stretching path of a stretching plant or stretching device;

adjusting the temperature of the polymer material web 100 fed in the previous step;

feeding the polymer material web 100 the temperature of which was adjusted in the previous step into a stretching plant or stretching device capable of stretching a polymer material web 100 at least in a transverse direction, said stretching plant or stretching device comprising a longitudinal path allowing a polymer material web 100 to pass along during the stretching step, a plurality of dual tenter clip and table assemblies 10 according to the above detailed description, capable of gripping the polymer material web 100 to be stretched, fixedly moving it along the longitudinal path and thereby stretching it, before the polymer material web 100 is released for storage or further processing, rails on both sides of the longitudinal path allowing said dual tenter clip and table assemblies 10 to run on, while being moved by endless chains along said longitudinal path and, after a release of the polymer material web 100 after the termination of the stretching step, back to the start of the stretching step; and storing the polymer material web 100, or transmitting the stretched polymer material web 100 for further processing, after the previous stretching step on said stretching plant or stretching device 200.

In both, the above transverse sheet stretching plant 200 of the present invention for stretching a polymer material web 100 at least in a transverse direction and the above process according to the present invention for stretching a polymer material sheet 100 at least in a transverse direction, a person skilled in the present technical field very well knows a number of means and devices, on the one hand, and process steps, on the other hand, which may be used in the plant or device 200 of the invention or which may be performed in the process of stretching a polymer material web 100 or polymer film 100 in order to achieve the desired purpose of obtaining a suitably stretched polymer material web or polymer film 100 after at least a step of stretching such a polymer in a transverse direction. Hence, the skilled person may select, in accordance with the circumstances, such means or devices, on the one hand, and such process steps, on the other hand, in order to adapt the plant or device 200 or the process for stretching to the desired parameters.

Non-exhaustive examples are the following:

The polymer to be stretched may be provided from polymer materials commonly used, which are very well known to a skilled person in this technical field and may, hence, be selected in an appropriate manner in accordance, for example, with the final use requirements. Non-restricting examples of such polymers are polyolefins (polyethylene, polypropylene, copolymers of polyethylene and polypropylene), polyesters (PET=polyethylene terephthalate, which might be oriented/stretched biaxially to BOPET=biaxially oriented polyethylene tere-phthalate), vinyl polymers and copolymers (ethylene vinylalcohol copolymers); etc. Such polymers are formed in/on usual devices (non-exhaustive examples of which are extruders and suitable polymer tube blowers) to polymer material webs, sheets or films.

Such films are, usually in a continuous manner, but possibly also discontinuously, i. e. after an intermediate storage in the form of, for example, storage rolls, fed to temperature-adjusting means, for example ovens, heated air heaters, heated rollers or similar devices suitable, in accordance with the knowledge a skilled person in this field may have, to adjust the temperature of the polymer to such a temperature or temperature range at which a stretching process may be performed.

In the subsequent step, the heated polymer material web is fed, usually also in a continuous manner in order to make use of the suitable temperature adjustment in the previous step, to the stretching plant or stretching device 200. The construction and specific configuration of such a plant or device 200 mainly depends on the specific stretching operation desired to be carried out. Usually, the stretching device has a longitudinal path along which the polymer material web 100 or polymer film 100 to be stretched is guided. Suitable rolls at the entrance and exit of said path may condition the polymer to be stretched.

In addition, since a stretching action in the transverse direction, i. e. in the direction usually perpendicular to the run of the polymer sheet, which is the so-called "machine direction" is desired, a number of rails, usually one rail on each side of the polymer path, is provided. Such rails are used to move on them means gripping the side edges of the polymer material sheet and, while moving in the longitudinal direction, stretching the polymer material web or polymer film 100 in the transverse direction. This is conducted in methods and by means generally known to a skilled person, who may select the suitable means and process steps to carry out the stretching step. One (non-restricting) example is a diverging course of the rails from the center of the machine-direction course of the sheet to the outside in the plane of the polymer sheet usually.

The means for gripping the side edges of the polymer sheet before, during and after the stretching step usually include tenter tables and tenter clips mounted to suitable carriages. Such carriages are running on the rails on both sides of the polymer sheet either on rolls or on gliding means, which running movement may be supported by suitable technical substances reducing the friction of the rolling or gliding process.

In any case, in accordance with the invention, there are used for the steps of stretching the polymer material web 100 or polymer film 100 at least in a transverse direction a plurality of dual tenter clip and table assemblies 10 according to the above detailed description. The dual tenter clip and table assemblies 10 of the invention comprise main and secondary tenter clip body carriages 22, 32 having tenter clips 28, 38 and tenter tables 26, 36 capable of gripping the polymer material web 100 to be stretched, fixedly moving it along the longitudinal path and thereby stretching it at least in the transversal direction.

Such dual tenter clip and table assemblies 10 according to the invention were described above in all details in general and in relation to preferred embodiments thereof. Such dual tenter clip and table assemblies may, hence, be used in accordance with the stretching plant and stretching device of the present invention, or in the process for stretching a polymer material web 100, in the broadest sense or in their specifically preferred embodiments. Another detailed description thereof may be omitted here, and reference is made to the above description of the dual tenter clip and table assembly 10 of the invention.

The force by which the main and secondary tenter table and tenter clip carriages 22, 32 are moved forward is usually transmitted by two endless chains 50 either of them moving in parallel to the rails 60 and driven by suitable driving means. Such driving means are also well known to a person skilled in the present technical field and may suitably be selected in accordance with the requirements needed. In specific, preferred, but not restricting embodiments, the driving means driving the endless chains 50 are sprocket wheels positioned at certain (usually the entrance and the exit) positions of the path of the endless chains 50 and driving the endless chains 50 under a control of the respective speeds.

Separate longitudinal stretching steps may be conducted before or after the step(s) of stretching of the polymer material sheet in the transverse direction, if desired, but are no essential step in the present process of stretching the polymer material web at least in the transverse direction. In addition, the polymer material sheet or film 100 might be subjected, in a final releasing step, to a minor decrease of the polymer material sheet length in order to stabilize the mono-oriented polymer film.

As usual, after the termination of the stretching step(s), which at least include(s), if not consist solely of, the transverse stretching step, the polymer web as stretched may be passed along another temperature adjusting means. The purpose of this additional temperature adjusting means is a temperature adjustment of the polymer material web 100 or polymer film 100 after the stretching step to such a temperature "locking" the polymer (specifically the molecular polymer chains) to that status which they achieved during the stretching step, so as to prevent shrinking of the polymer sheet and allowing it to keep the mechanical and optical properties achieved by the stretching procedure.

Finally, the polymer material web 100 or polymer film 100 is either stored, e. g. by winding it onto a suitable storage roll, before it is further processed or used for the desired purpose, or is directly further processed, fed to subsequent plants or devices for further treatment (e. g. printing of images or text on one side of the polymer sheet) and used for the final purpose.

The invention was explained above by in detail referring to the preferred embodiments thereof. The invention, however, is not restricted to the embodiments shown in the FIGs or described in the description, particularly not to those embodiments described as preferred embodiments. The embodiments shown in the FIGs and/or described in the description as preferred embodiments serve to allow a better and/or more comprehensive understanding of the invention.

The features of the present invention described in connection to preferred embodiments may be put into practice as single features or as a combination of one feature with one other feature or as a combination of one feature with a few, with some or with all other features according to the present description. All these different combinations of two or more features of the invention are to be considered as covered by the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

To sum up, the present invention provides:

1. A dual tenter clip and table assembly (10) for moving, by means of an endless chain (50) consisting of alternating pairs of first chain links (51) and pairs of second chain links (52) rotatably connected by means of pins (53) arranged in parallel to the plane of the rail (60) and perpendicular to the direction of the endless chain's movement, a polymer material web (100) on a stretching plant or stretching device for stretching said polymer material web (100) at least in a transverse direction (T), said assembly (10) comprising a main tenter clip body (20) comprising a main tenter clip body carriage (22) having a plurality of wheels (24a, 24b, . . . ) moving the carriage (22) along a rail (60) by means of said endless chain (50) to which the carriage (22) of the main tenter clip body (20) is fixed;

said carriage (22) of the main tenter clip body (20) further comprising a tenter table (26) onto which the polymer material web (100) to be stretched is fixed by a tenter clip (28); and said carriage (22) of the main tenter clip body (20) being fixed to a first chain link (51) of the endless chain (50) by means of a vertical pin (29) positioned in parallel to the pins (53) connecting first and second chain links (51, 52) and passing through at least one structural part of the main tenter clip body (20);

and said assembly (10) further comprising a secondary tenter clip body (30) comprising a secondary tenter clip body carriage (32), said carriage (32) of the secondary tenter clip body (30) further comprising a tenter table (36) onto which the polymer material web (100) to be stretched is fixed by a tenter clip (38); and said carriage (32) of the secondary tenter clip body (30) being fixed to a second chain link (52) of the endless chain (50) by means of a vertical pin (39) positioned in parallel to the pins (53) connecting first and second chain links (51, 52) and passing through at least one structural part of the secondary tenter clip body (30);

wherein outer walls of said carriage (32) of the secondary tenter clip body (30) on both sides opposite to outer walls of one or two adjacent main tenter clip body carriage(s) (22) are shaped in a manner preventing a contact of said outer walls of the secondary tenter clip body carriage (32) to said outer walls of one or two adjacent main tenter clip body carriages (22).

2. The dual tenter clip and table assembly (10) according to item 1, wherein the main tenter clip body carriage (22) has a shape of its section, seen in the direction of the carriage movement along the rail (60), of a letter "C", preferably wherein the upper and lower part of the main tenter clip body carriage's letter "C" provide a support for a fixation, by means of said vertical pin (29), of the main tenter clip body carriage (22) to the first chain links (51) of the endless chain (50), and/or the back part of the main tenter clip body carriage's letter "C" carry the tenter table (26) and the tenter clip (28).

3. The dual tenter clip and table assembly (10) according to item 1 or item 2, wherein the secondary tenter clip body carriage (32) has a shape of its section, seen in the direction of the carriage movement along the rail (60), of a letter "C", preferably wherein the upper and lower part of the secondary tenter clip body carriage's letter "C" provide a support for a fixation, by means of said vertical pin (39), of the secondary tenter clip body carriage (32) to the second chain links (52) of the endless chain (50), and/or the back part of the secondary tenter clip body carriage's letter "C" carry the tenter table (36) and the tenter clip (38).

4. The dual tenter clip and table assembly (10) according to any of the items 1 to 3, wherein said vertical pin (29) fixing the main tenter clip body carriage (22) to the first chain links (51) of said endless chain (50) is passing through the upper and lower arms of the "letter C" shape of the main tenter clip body carriage (22), thereby non-rotatably fixing the main tenter clip body carriage (22) to the endless chain (50).

5. The dual tenter clip and table assembly (10) according to any of the items 1 to 4, wherein said vertical pin (39) fixing the secondary tenter clip body carriage (32) to the second chain links (52) of said endless chain (50) is passing through the upper and lower arms of the "letter C" shape of the secondary tenter clip body carriage (32), thereby non-rotatably fixing the secondary tenter clip body carriage (32) to the endless chain (50).

6. The dual tenter clip and table assembly (10) according to any of the items 1 to 5, wherein the first chain links are the outer chain links and the second chain links are the inner chain links.

7. The dual tenter clip and table assembly (10) according to any of the items 1 to 6, wherein the main tenter clip body carriage (22) is moving along the rail (60), drawn by the endless chain (60), on a plurality of wheels amounting up to 10 in number, preferably amounting to 9 in number.

8. The dual tenter clip and table assembly (10) according to any of the items 1 to 7, wherein the outer walls of the main tenter clip body carriages (22) opposing the outer walls of the secondary tenter clip body carriages (32) and the outer walls of the secondary tenter clip body carriages (32) opposing the outer walls of the main tenter clip body carriages (22) have an oppositely shaped curvature, preferably wherein a convex shape of the outer walls of the main tenter clip body carriages (22) and a concave shape of the opposing outer walls of the intermediate secondary tenter clip body carriages (32) are capable of preventing a contact of the outer walls of the secondary tenter clip body carriages (32) to the outer walls of the adjacent main tenter clip body carriages (22).

9. The dual tenter clip and table assembly (10) according to any of the items 1 to 7, wherein the tenter table length (TL) is selected to be in a range of from 0.75 P to 0.98 P (i. e. $0.75\,P \leq TL \leq 0.98\,P$), preferably in a range of from 0.9 P to 0.94 P (i. e. $0.90\,P \leq TL \leq 0.94\,P$), wherein P is the pitch of the endless chain 50.

10. The dual tenter clip and table assembly (10) according to any of the items 1 to 9, wherein the walls of the main and secondary tenter clip bodies (22, 32) are equipped with baffles to prevent lubricant/oil leakages.

11. The dual tenter clip and table assembly (10) according to any of the items 1 to 10, wherein the tenter clips (28, 38) capable of fixing the polymer material web (100) to be stretched on the tenter tables (26, 36) are capable of being actuated mechanically or electronically before the beginning or after the end of the stretching cycle.

12. A transverse sheet stretching plant or stretching device (200) for stretching a polymer material web (100) at least in a transverse direction, said plant comprising
at least one element for providing a polymer material web (100) to be subjected to a stretching action at least in the transverse direction;
at least one element for adjusting the temperature of the polymer material web (100) provided in the previous step;
a stretching plant or stretching device capable of stretching a polymer material web (100) at least in a transverse direction, said stretching plant or stretching device comprising a longitudinal path allowing a polymer material web (100) to pass along during the stretching step, a plurality of dual tenter clip and table assemblies (10) according to any one of the items 1 to 11 capable of gripping the polymer material web (100) to be stretched, fixedly moving it along the longitudinal path and thereby stretching it, before the polymer material web (100) is released for storage or further processing, rails on both sides of the longitudinal path allowing said dual tenter clip and table assemblies (10) to run on, while being moved by endless chains along said longitudinal path and, after a release of the polymer material web (100) after the termination of the stretching step, back to the start of the stretching step; and
at least one element for storing the polymer material web (100), or transmitting the stretched polymer material web (100) for further processing, after the previous stretching step on said stretching plant or stretching device (200).

13. A process for stretching a polymer material sheet (100) at least in a transverse direction, said process comprising
providing a polymer material web (100) to be subjected to a stretching action at least in the transverse direction;
feeding said polymer material web (100) provided in the previous step into the stretching path of a stretching plant or stretching device;
adjusting the temperature of the polymer material web (100) fed in the previous step;
feeding the polymer material web (100) the temperature of which was adjusted in the previous step into a stretching plant or stretching device capable of stretching a polymer material web (100) at least in a transverse direction, said stretching plant or stretching device comprising a longitudinal path allowing a polymer material web (100) to pass along during the stretching step, a plurality of dual tenter clip and table assemblies (10) according to any one of the items 1 to 11 capable of gripping the polymer material web (100) to be stretched, fixedly moving it along the longitudinal path and thereby stretching it, before the polymer material web (100) is released for storage or further processing, rails on both sides of the longitudinal path allowing said dual tenter clip and table assemblies (10) to run on, while being moved by endless chains along said longitudinal path and, after a release of the polymer material web (100) after the termination of the stretching step, back to the start of the stretching step; and storing the polymer material web (100), or transmitting the stretched polymer material web (100) for further processing, after the previous stretching step on said stretching plant or stretching device (200).

LIST OF REFERENCE NUMERALS 10 dual tenter clip and table assembly
20 main tenter clip body
20a main tenter clip body outer wall
22 main tenter clip body carriage
24a, 24b, . . . wheels
26 tenter table of main tenter clip body 20
28 tenter clip of main tenter clip body 20
29 vertical pin for main tenter clip body fixation to first/outer chain links 51
30 secondary tenter clip body
30a secondary tenter clip body outer wall
32 secondary tenter clip body carriage
36 tenter table of secondary tenter clip body 30
38 tenter clip of secondary tenter clip body 30
39 vertical pin for secondary tenter clip body fixation to second/inner chain links 52
50 endless chain
51 first/outer chain links of endless chain 50
52 second/inner chain links of endless chain 50
53 pins rotatably connecting outer and inner chain links 51, 52
60 rail
100 polymer material web or polymer film
200 transverse sheet stretching plant
T transverse stretching direction
L longitudinal stretching direction
TL tenter table length
P pitch

What is claimed is:

1. A dual tenter clip and table assembly for moving, by means of an endless chain consisting of alternating pairs of first chain links and pairs of second chain links rotatably connected by pins arranged in parallel to a plane of a rail and perpendicular to a direction of the endless chain's movement, a polymer material web on a stretching plant or stretching device for stretching said polymer material web at least in a transverse direction, said assembly comprising a main tenter clip body comprising a main tenter clip body carriage having a plurality of wheels moving the carriage along a single rail by said endless chain to which a carriage of the main tenter clip body is fixed;

said carriage of the main tenter clip body further comprising a tenter table onto which the polymer material web to be stretched is fixed by a tenter clip; and said carriage of the main tenter clip body being fixed to a first chain link of the endless chain by a vertical pin positioned in parallel to pins connecting first and second chain links and passing through at least one structural part of the main tenter clip body;

and said assembly further comprising a secondary tenter clip body different in structure from the main tenter clip body and comprising a secondary tenter clip body carriage, said carriage of the secondary tenter clip body further comprising a tenter table onto which the polymer material web to be stretched is fixed by a tenter clip; and said carriage of the secondary tenter clip body being fixed to a second chain link of the endless chain by a vertical pin positioned in parallel to pins connecting first and second chain links and passing through at least one structural part of the secondary tenter clip body;

wherein outer walls of the main tenter clip body carriages opposing outer walls of the secondary tenter clip body carriages and outer walls of the secondary tenter clip body carriages opposing outer walls of the main tenter clip body carriages have an oppositely shaped curvature to not come into contact with each other during operation of the assembly.

2. The dual tenter clip and table assembly according to claim 1, wherein the main tenter clip body carriage has a shape of its section, seen in a direction of a carriage movement along the rail, of a letter "C".

3. The dual tenter clip and table assembly according to claim 2, wherein an upper and lower part of the main tenter clip body carriage's letter "C" provide a support for a fixation, by said vertical pin, of the main tenter clip body carriage to the first chain links of the endless chain and/or a back part of the main tenter clip body carriage's letter "C" carries the tenter table and the tenter clip.

4. The dual tenter clip and table assembly according to claim 1, wherein the secondary tenter clip body carriage has a shape of its section, seen in a direction of the carriage movement along the rail, of a letter "C".

5. The dual tenter clip and table assembly according to claim 4, wherein an upper and lower part of the secondary tenter clip body carriage's letter "C" provide a support for a fixation, by said vertical pin, of the secondary tenter clip body carriage to the second chain links of the endless chain and/or a back part of the secondary tenter clip body carriage's letter "C" carries the tenter table and the tenter clip.

6. The dual tenter clip and table assembly according to claim 1, wherein said vertical pin fixing the main tenter clip body carriage to the first chain links of said endless chain is passing through upper and lower arms of a "letter C" shape of the main tenter clip body carriage, thereby non-rotatably fixing the main tenter clip body carriage to the endless chain.

7. The dual tenter clip and table assembly according to claim 1, wherein said vertical pin fixing the secondary tenter clip body carriage to the second chain links of said endless chain is passing through upper and lower arms of a "letter C" shape of the secondary tenter clip body carriage, thereby non-rotatably fixing the secondary tenter clip body carriage to the endless chain.

8. The dual tenter clip and table assembly according to claim 1, wherein the first chain links are outer chain links and the second chain links are inner chain links.

9. The dual tenter clip and table assembly according to claim 1, wherein the outer walls of the main tenter clip body carriages have a convex shape and the opposing outer walls of the intermediate secondary tenter clip body carriages have a concave shape.

10. The dual tenter clip and table assembly according to claim 1, wherein the tenter table length (TL) is in a range of from 0.75 P to 0.98 P (i. e. 0.75 P≤TL≤0.98 P), wherein P is the pitch of the endless chain.

11. The dual tenter clip and table assembly according to claim 10, wherein the tenter table length (TL) is in a range of from 0.9 P to 0.94 P (i. e. 0.90 P≤TL≤0.94 P).

12. The dual tenter clip and table assembly according to claim 1, wherein the tenter clips capable of fixing the polymer material web to be stretched on the tenter tables are capable of being actuated mechanically or electronically before the beginning or after the end of the stretching cycle.

13. A transverse sheet stretching plant or stretching device for stretching a polymer material web at least in a transverse direction, said plant comprising
   at least one element for providing a polymer material web to be subjected to a stretching action at least in the transverse direction;
   at least one element for adjusting a temperature of the polymer material web provided in a previous step;
   a stretching plant or stretching device capable of stretching a polymer material web at least in a transverse direction, said stretching plant or stretching device comprising a longitudinal path allowing a polymer material web to pass along during a stretching step, a plurality of dual tenter clip and table assemblies according to claim 1 capable of gripping the polymer material web to be stretched, fixedly moving it along a longitudinal path and thereby stretching it, before the polymer material web is released for storage or further processing, rails on both sides of the longitudinal path allowing said dual tenter clip and table assemblies to run on, while being moved by endless chains along said longitudinal path and, after a release of the polymer material web after termination of the stretching step, back to a start of the stretching step; and
   at least one element for storing the polymer material web, or transmitting the stretched polymer material web for further processing, after a previous stretching step on said stretching plant or stretching device.

14. A process for stretching a polymer material sheet at least in a transverse direction, said process comprising
   providing a polymer material web to be subjected to a stretching action at least in the transverse direction;
   feeding said polymer material web provided in the previous step into the stretching path of a stretching plant or stretching device;
   adjusting a temperature of the polymer material web fed in the previous step;
   feeding the polymer material web the temperature of which was adjusted in the previous step into a stretching plant or stretching device capable of stretching a polymer material web at least in a transverse direction, said stretching plant or stretching device comprising a longitudinal path allowing a polymer material web to pass along during a stretching step, a plurality of dual tenter clip and table assemblies according to claim 1 capable of gripping the polymer material web to be stretched, fixedly moving it along the longitudinal path and thereby stretching it, before the polymer material web is released for storage or further processing, rails on both sides of the longitudinal path allowing said dual tenter clip and table assemblies to run on, while being moved by endless chains along said longitudinal path and, after a release of the polymer material web after termination of the stretching step, back to a start of the stretching step; and
   storing the polymer material web, or transmitting the stretched polymer material web for further processing, after a previous stretching step on said stretching plant or stretching device.

15. The dual tenter clip and table assembly according to claim 1, wherein the alternating pairs of first chain links and pairs of second chain links of the endless chain do not tilt during operation of the assembly.

16. The dual tenter clip and table assembly according to claim 1, wherein the main and secondary tenter clip bodies are arranged in an alternating manner.

17. The dual tenter clip and table assembly according to claim 1, wherein a pitch P of the endless chain is constant over an entire length of the endless chain and does not change during operation of the assembly.

18. The dual tenter clip and table assembly according to claim 1, wherein the secondary tenter clip carriages do not have wheels for guiding them along the single rail.

19. The dual tenter clip and table assembly according to claim 16, wherein the main tenter clip bodies have a larger size than the secondary tenter clip bodies.

20. The dual tenter clip and table assembly according to claim 1, wherein a diameter of a wheel on a side of the rail which is opposite a side on which the main tenter clip body carriage has the tenter clip and the tenter table is larger than a diameter of a wheel which is on a side of the rail on which the main tenter clip body carriage has the tenter clip and the tenter table.

* * * * *